US012669630B2

(12) United States Patent
Otsuki et al.

(10) Patent No.: US 12,669,630 B2
(45) Date of Patent: Jun. 30, 2026

(54) OBJECT DETECTION SYSTEM AND OBJECT DETECTION METHOD

(71) Applicant: NTT, Inc., Tokyo (JP)

(72) Inventors: Shinya Otsuki, Musashino (JP);
Tomoki Murakami, Musashino (JP);
Tomoaki Ogawa, Musashino (JP)

(73) Assignee: NTT, Inc., Tokyo (JP)

( * ) Notice: Subject to any disclaimer, the term of this patent is extended or adjusted under 35 U.S.C. 154(b) by 593 days.

(21) Appl. No.: 18/266,515

(22) PCT Filed: Dec. 17, 2020

(86) PCT No.: PCT/JP2020/047246
§ 371 (c)(1),
(2) Date: Jun. 9, 2023

(87) PCT Pub. No.: WO2022/130585
PCT Pub. Date: Jun. 23, 2022

(65) Prior Publication Data
US 2024/0036227 A1 Feb. 1, 2024

(51) Int. Cl.
*G01V 3/12* (2006.01)
*G06N 20/00* (2019.01)
*H04W 88/02* (2009.01)

(52) U.S. Cl.
CPC ............... *G01V 3/12* (2013.01); *G06N 20/00* (2019.01); *H04W 88/02* (2013.01)

(58) Field of Classification Search
CPC .......... G01V 3/12; G06N 20/00; H04W 88/02
See application file for complete search history.

(56) References Cited

U.S. PATENT DOCUMENTS 11,075,929 B1 * 7/2021 Li ......................... H04L 1/0003
11,530,925 B1 * 12/2022 Shields .................. G08G 1/164
(Continued)

FOREIGN PATENT DOCUMENTS

CA 3042851 A1 * 5/2018 ............ H04W 72/20
CA 3138202 A1 * 11/2020 ............... G06N 7/01
(Continued)

OTHER PUBLICATIONS

Otsuki et al., "Results of Experiments on Object Sensing for intelligent radio-space design," The Institute of Electronics, Information and Communication Engineers Communication Society Conference, Sep. 15-18, 2020, 3 pages (with machine translation).
(Continued)

*Primary Examiner* — Vinh T Lam
(74) *Attorney, Agent, or Firm* — Fish & Richardson P.C.

(57) ABSTRACT
A capture device which captures propagation path information communicated between the two or more wireless devices and transmits the propagation path information to a first detection device and a second detection device; and a learning model generation device which generates a learning model for object detection using supervised machine learning are provided. The first detection device performs object detection between the wireless devices using a learning model generated by the learning model generation device, the second detection device performs object detection with higher accuracy than the first detection device, and the learning model generation device generates and updates a learning model which is used by the first detection device as teacher data using determination data including object detection results of the second detection device. This makes it possible to easily generate a learning model using supervised machine learning without spending time or manpower.

6 Claims, 5 Drawing Sheets

(56)  References Cited

U.S. PATENT DOCUMENTS

| | | | | |
|---|---|---|---|---|
| 12,099,357 | B1 * | 9/2024 | Ebrahimi Afrouzi | ......................... G05D 1/0214 |
| 12,316,395 | B2 * | 5/2025 | Kudo | ..................... G06V 10/72 |
| 2018/0365975 | A1 * | 12/2018 | Xu | ........................ G08B 29/185 |
| 2019/0361140 | A1 * | 11/2019 | Lee | ......................... G01V 3/28 |
| 2020/0364187 | A1 * | 11/2020 | Tran | ......................... G06N 3/02 |
| 2020/0404598 | A1 * | 12/2020 | Landis | ............... H04W 52/367 |
| 2021/0051465 | A1 * | 2/2021 | Koshy | ................ H04W 52/367 |
| 2021/0076272 | A1 * | 3/2021 | Berglund | .......... H04W 36/0072 |
| 2021/0159990 | A1 * | 5/2021 | Meylan | ............... H04B 17/202 |
| 2022/0171016 | A1 * | 6/2022 | Manolakos | ............. G01S 7/003 |
| 2023/0084947 | A1 * | 3/2023 | Mahiout | ................ G06N 20/10 175/24 |

FOREIGN PATENT DOCUMENTS

| | | | | | |
|---|---|---|---|---|---|
| JP | 2010243231 | A | * | 10/2010 | |
| JP | 5004991 | B2 | * | 8/2012 | |
| WO | WO-2018030422 | A2 | * | 2/2018 | ......... G05B 23/0254 |
| WO | WO-2020209380 | A1 | * | 10/2020 | ........... H04B 17/309 |
| WO | WO-2022130585 | A1 | * | 6/2022 | .............. G01V 3/12 |
| WO | WO-2022165236 | A1 | * | 8/2022 | ............. G06N 20/00 |
| WO | WO-2024232005 | A1 | * | 11/2024 | ........... H04W 24/00 |
| WO | WO-2025173069 | A1 | * | 8/2025 | ........... H04W 24/10 |

OTHER PUBLICATIONS

Yu et al., "Beamforming Transmission in IEEE 802.11ac under Time-Varying Channels," The Scientific World Journal, Jul. 2014, 11 pages.

* cited by examiner

[Fig. 1]
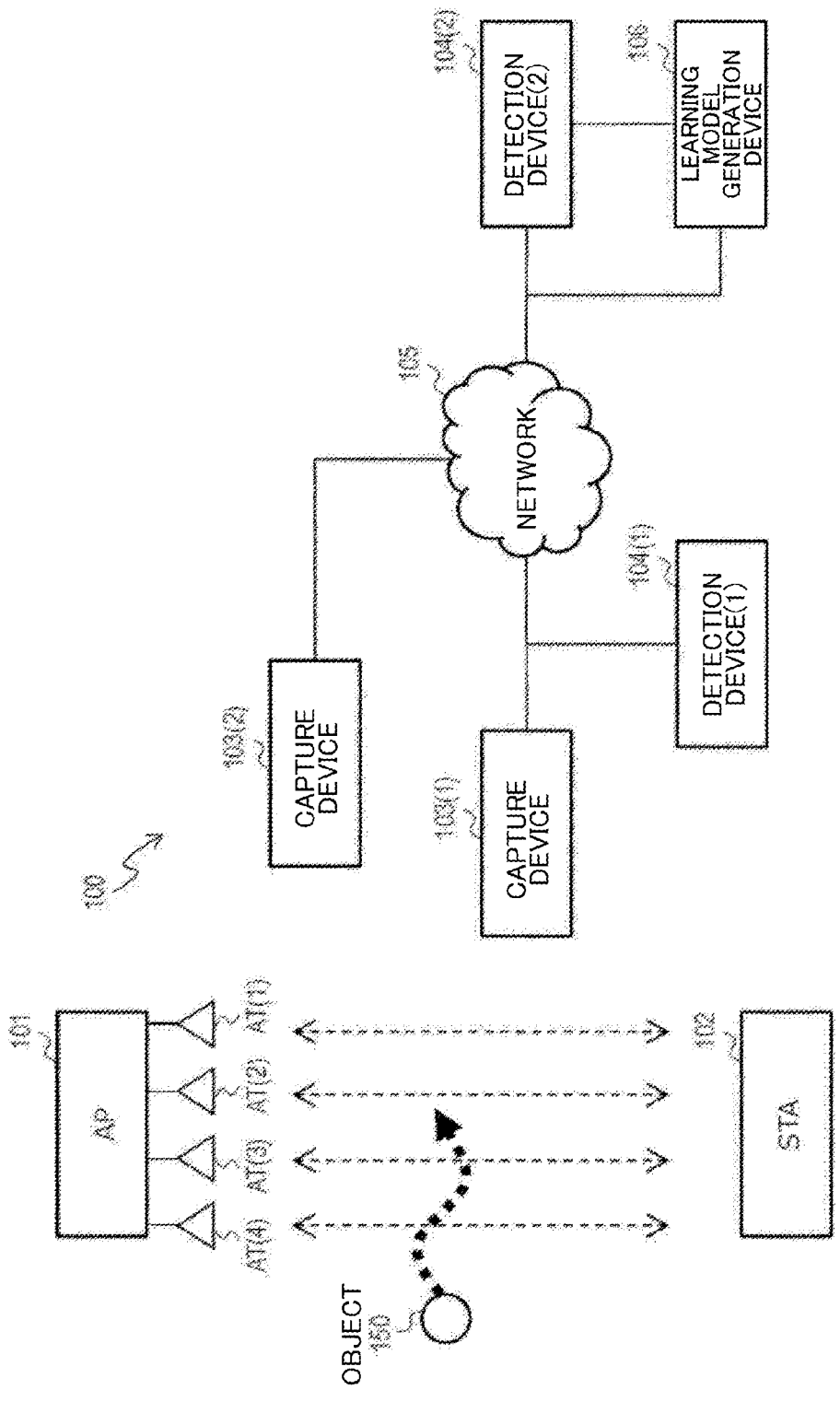

[Fig. 2]
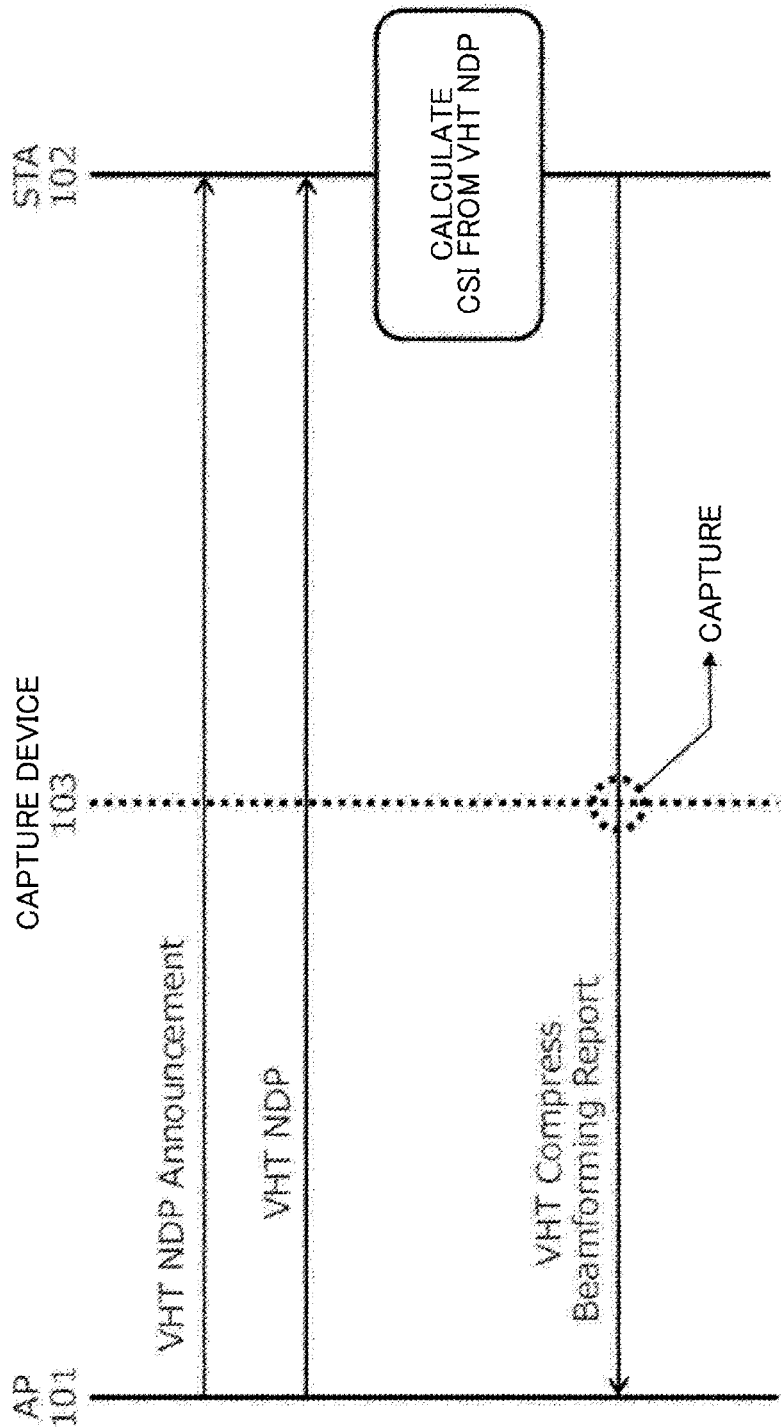

[Fig. 3]
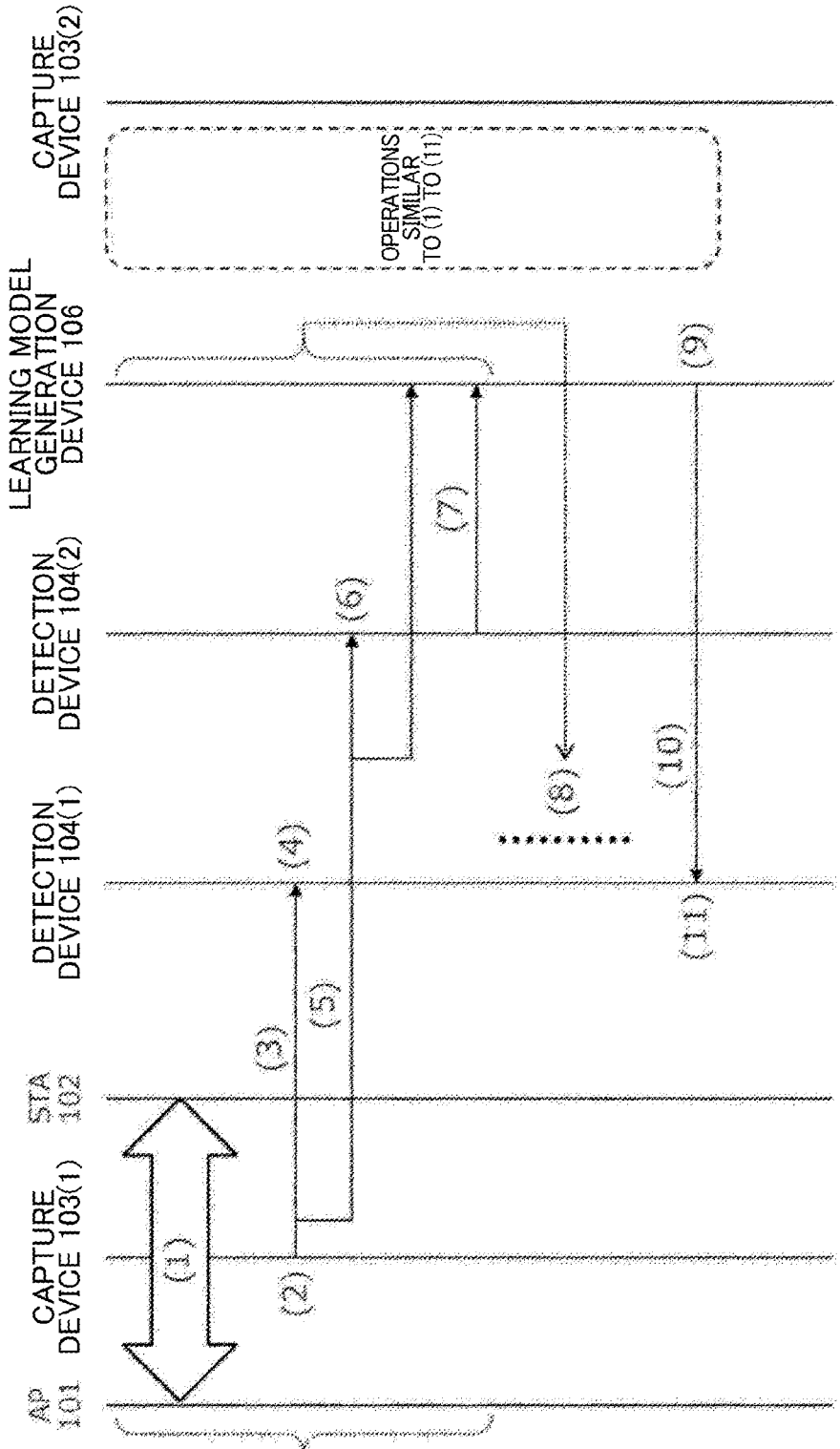

[Fig. 4]

| RECEPTION TIME | AP ADDRESS | STA ADDRESS | CAPTURE DEVICE NUMBER | ACQUIRED CSI |
|---|---|---|---|---|
| 14:00:00 | AA:BB:CC:DD:EE:FF | 11:22:33:44:55:66 | (1) | $\phi$11, $\phi$21, ... |
| 14:00:01 | AA:BB:CC:DD:EE:FF | 11:22:33:44:55:66 | (2) | $\phi$11, $\phi$21, ... |
| 14:00:02 | AA:BB:CC:DD:EE:FF | 11:22:33:44:55:66 | (1) | $\phi$11, $\phi$21, ... |
| 14:00:03 | AA:BB:CC:DD:EE:FF | 11:22:33:44:55:66 | (2) | $\phi$11, $\phi$21, ... |
| .... | .... | .... | .... | .... |

[Fig. 5]

| NUMBER OF TRANSMISSION ANTENNAS × NUMBER OF RECEPTION ANTENNAS | NUMBER OF COMPRESSED CSIS | COMPRESSED CSI |
|---|---|---|
| 2 × 1 | 2 | $\phi 11,\ \psi 21$ |
| 2 × 2 | 2 | $\phi 11,\ \psi 21$ |
| 3 × 1 | 4 | $\phi 11,\ \phi 21,\ \psi 21,\ \psi 31$ |
| 3 × 2 | 6 | $\phi 11,\ \phi 21,\ \psi 21,\ \psi 31,\ \phi 22,\ \psi 31$ |
| 3 × 3 | 6 | $\phi 11,\ \phi 21,\ \psi 21,\ \psi 31,\ \phi 22,\ \psi 31$ |
| 4 × 1 | 6 | $\phi 11,\ \phi 21,\ \phi 31,\ \psi 21,\ \psi 31,\ \psi 41$ |
| 4 × 2 | 10 | $\phi 11,\ \phi 21,\ \phi 31,\ \psi 21,\ \psi 31,\ \psi 41,\ \phi 22,\ \phi 32,\ \psi 32,\ \psi 42$ |
| · | · | · |
| · | · | · |
| 8 × 8 | 56 | $\phi 11,\ \phi 21,\ \phi 31,\ \phi 41,\ \phi 51,\ \phi 61,\ \phi 71,\ \cdots$ |

OBJECT DETECTION SYSTEM AND OBJECT DETECTION METHOD

CROSS-REFERENCE TO RELATED APPLICATIONS

This application is a National Stage application under 35 U.S.C. § 371 of International Application No. PCT/JP2020/047246, having an International Filing Date of Dec. 17, 2020. The disclosure of the prior application is considered part of the disclosure of this application, and is incorporated by reference in its entirety into this application.

TECHNICAL FIELD

The present invention relates to a technique for detecting an object using supervised machine learning in an object detection system which detects an object in a communication area from propagation path information of radio signals communicated between wireless devices.

BACKGROUND ART

In the related art, a method using supervised machine learning has been studied in the case of detecting an object in a communication area from propagation path information of radio signals communicated between wireless devices (refer to, for example, NPL 1). Note that, as an example of propagation path information communicated between wireless devices, in a wireless local area network (LAN) system, an access point (AP) transmits a reference signal for measuring a state of a propagation path to a station (STA) and the STA transmits the measured propagation path information to the AP (for example, NPL 2).

CITATION LIST

Non Patent Literature

[NPL 1] "Evaluation of Advanced Wireless Sensing Technology for Formation of Intelligent Space", B5-24, IEICE Society Conference 2020, September 2020
[NPL 2] H. Yu and T. Kim, "Beamforming transmission in IEEE 802.11ac under time-varying channels," The Scientific World J., vol. 2014, pp. 1-11, Jul. 2014, article ID 920937.

SUMMARY OF INVENTION

Technical Problem

In wireless sensing using machine learning, in order to improve accuracy and perform high-performance sensing such as counting people, increasing an amount of data for learning models or increasing an amount of data used for determination is required. Particularly, when supervised machine learning is used, workers manually actually install objects in various positions to generate teacher data, which is a problem in that it takes a lot of manpower and time. Alternatively, although there is a method of generating teacher data using image data captured by a camera or various sensors such as a laser scanner, in addition to manually generating teacher data, both methods have the problem that it takes time to generate teacher data.

In addition, when only low-performance detection devices can be used due to restrictions on the installation location, increasing an amount of learning data and determination data increases a time required for determination. On the other hand, although it is easy to increase the functionality and improve the detection accuracy in the case of a high-performance detection device, the size of the device becomes large. Thus, there is a problem that the installation place is restricted.

In an object detection system and an object detection method according to the present invention, it is possible to easily generate a learning model for object detection using supervised machine learning without spending time or manpower and it is possible to use the generated learning models in other detection devices by installing a plurality of detection devices with different performances in a plurality of locations and using outputs of the detection devices which perform highly accurate object detection as teacher data in a system for detecting an object in a communication area from propagation path information of radio signals.

Solution to Problem

The present invention includes: an object detection system for detecting an object between two or more wireless devices on the basis of propagation path information between the wireless devices, which includes a capture device which captures propagation path information between the wireless devices and transmits the propagation path information to a first detection device and a second detection device; and a learning model generator which generates a learning model for object detection using supervised machine learning, wherein the first detection device performs object detection between the wireless devices using the learning model generated by the learning model generation device, the second detection device performs object detection with higher accuracy than the first detection device, and the learning model generation device generates and updates the learning model which is used by the first detection device as teacher data using determination data including object detection results of the second detection device.

Also, the present invention includes: an object detection method for detecting an object between two or more wireless devices on the basis of propagation path information between the wireless devices, which includes: a capture device which captures propagation path information between the wireless devices and transmits the propagation path information to a first detection device and a second detection device; and a learning model generation device which generates a learning model for object detection using supervised machine learning, wherein the first detection device performs object detection between the wireless devices using the learning model generated by the learning model generation device, the second detection device performs object detection with higher accuracy than the first detection device, and the learning model generation device generates and updates a learning model which is used by the first detection device as teacher data using determination data including object detection results of the second detection device.

Advantageous Effects of Invention

In an object detection system and an object detection method according to the present invention, it is possible to easily generate a learning model for object detection using supervised machine learning without spending time or manpower and it is possible to use the generated learning models in other detection devices by installing a plurality of detection devices with different performances in a plurality of locations and using outputs of the detection devices which perform highly accurate object detection as teacher data in a system for detecting an object in a communication area from propagation path information of radio signals.

Furthermore, generally, although it is difficult to install detection devices near the detection location or to install a large number of devices because the hardware size and power consumption of the detection devices which perform highly accurate determination are large, the difficulty can be solved by installing a device which performs highly accurate determination at a remote location using a network.

BRIEF DESCRIPTION OF DRAWINGS

FIG. 1 is a diagram illustrating an example of an object detection system according to an embodiment.

FIG. 2 is a diagram showing a sequence example of radio signals communicated between an AP and STAs.

FIG. 3 is a diagram showing a sequence example of an object detection method according to the embodiment.

FIG. 4 is a diagram showing an example of capture information acquired by a detection device FIG. 5 shows an example of compressed CSI transmitted from a STA to an AP.

DESCRIPTION OF EMBODIMENTS

Embodiments of an object detection system and an object detection method according to the present invention will be described below with reference to the drawings. Here, the object detection system according to the present invention is a system in which a CSI communicating between wireless devices to detect objects in a communication area of the wireless communication system using a wireless communication system in which propagation path information (referred to as channel state information (CSI) in the embodiment) between at least two wireless devices such as a base station device and a terminal device is measured and which communicates the measurement results. Note that, although a wireless LAN system will be described as a wireless communication system in the following embodiments, any system which performs wireless communication by measuring the state of a propagation path can be similarly applied.

FIG. 1 shows an example of an object detection system 100 according to an embodiment. In FIG. 1, an AP 101 corresponding to a base station device and an STA 102 corresponding to a terminal device perform communication corresponding to the wireless LAN standard 802.11ac.

In FIG. 1, the AP 101 has four antennas (AT(1), AT(2), AT(3), and AT(4)). Note that, although an example in which the AP 101 has four antennas is shown in FIG. 1, the AP 101 may have two or more antennas. Also, it is assumed that the STA 102 has at least one antenna. Furthermore, although FIG. 1 shows an example in which one STA 102 is provided, the embodiment can be applied even when multi user multiple input multiple output (MU-MIMO) transmission is performed between the AP 101 and a plurality of STAs 102.

In FIG. 1, the AP 101 transmits a very high throughput null data packet (VHT NDP) to the STAs 102 as a reference signal for measuring a state of each propagation path between each antenna of the AP 101 and each of the STAs 102. Furthermore, the STA 102 calculates CSI indicating the state of the propagation path between each antenna of the AP 101 and the STA 102 from the VHT NDP, stores the result in a VHT Compressed Beam Forming Report frame, and transmits it to AP 101. The AP 101 performs transmission beam formation processing or the like on the basis of the CSI received from the STA 102. Note that signals transmitted and received between the AP 101 and the STA 102 will be described later.

In FIG. 1, an object detection system 100 according to the embodiment includes a capture device 103(1), a capture device 103(2), a detection device 104(1), a detection device 104(2), and a learning model generation device 106.

The capture device 103(1) and the capture device 103(2) are installed near a communication area including a communication area between the AP 101 and the STA 102, monitor wireless LAN frames communicated between the AP 101 and the STA 102, and capture a frame. The capture device 103(1) and the capture device 103(2) determine the VHT Compressed Beamforming Report frame transmitted from the STA 102 to the AP 101 among the wireless LAN frames communicated between the AP 101 and the STA 102 and capture the frame. A frame in which the captured compressed CSI is stored and information on the reception time of the frame are transmitted to both the detection device 104(1) and the detection device 104(2) which will be described later. Alternatively, the capture device 103(1) may transmit the capture information to both of the detection device 104(1) and the detection device 104(2) and the capture device 103(2) may transmit the capture information only to the detection device 104(2). Furthermore, CSI measurement and measurement result transmission are performed periodically between the AP 101 and the STA 102. Note that, in the following description, when the capture device 103(1) and the capture device 103(2) are the same, the (number) at the end of the code is omitted and the capture device 103 is described.

The detection device 104(1) operates as a first detection device and receives the frame including the compressed CSI transmitted from the capture device 103 and information on the reception time of the frame (hereinafter abbreviated as capture information as necessary). Here, the detection device 104(1) performs object detection using a learning model generated by a learning model generation device 106 which will be described later. Note that the detection device 104(1) is installed at the same place as the capture device 103 installed near the communication area or near the capture device 103 in which data transfer does not take much time. In this way, the detection device 104(1) has restrictions on an installation location thereof and is smaller in device scale and lower in performance such as processing capacity than the detection device 104(2) which will be described later. Therefore, when detecting an object without using a learning model as in the embodiment, the detection device 104(1) can only perform simple object detection in which the presence or absence of objects is detected in real time on the basis of the capture information received from the capture device 103 with low accuracy. However, in the embodiment, object detection is performed using a learning model generated by machine learning using determination data including the detection result of the detection device 104(2) which performs highly accurate object detection as teacher data. Thus, highly accurate object detection is possible even with the low-performance detection device 104(1). Here, the determination data is various information analyzed by highly accurate and highly functional processing of the detection device 104(2) such as, for example, the correspondence between a plurality of conditions such as the magnitude and change of the phase and amplitude of each antenna of the AP 101 and the detection results such as the position and movement of the object under each condition.

The detection device 104 (2) operates as a second detection device and receives capture information transmitted from capture device 103. Furthermore, the detection device 104(2) performs object detection on the basis of the capture information. Note that the detection device 104(2) is installed remotely via the network 105. Therefore, the detection device 104(2) has few restrictions such as installation location and power supply. Thus, performance such as processing capacity is higher than that of the detection device 104(1), it is possible to install a large-scale device which can process large amounts of data at high speed, and it is possible to perform highly accurate and advanced object detection processing and analysis which does not require real-time performance. Thus, the detection device 104(2) provides, to the learning model generation device 106, determination data including object detection results as teacher data for the learning model generation device 106 which will be described later to generate a learning model by supervised machine learning.

The network 105 corresponds to the Internet or a dedicated communication network including communication devices such as network switches.

The learning model generation device 106 generates a learning model using determination data including object detection results of the detection device 104(2) which performs highly accurate object detection as teacher data. Also, the learning model generation device 106 transmits the generated learning model to the detection device 104(1). Note that each time the learning model generation device 106 generates a new learning model, the learning model generation device 106 transmits the newly generated learning model to the detection device 104(1) and updates the learning model of the detection device 104(1) to the latest learning model.

Thus, in the object detection system 100 according to the embodiment, the capture device 103 can capture CSI transmitted from the STA 102 to the AP 101 and detect an object in the communication area on the basis of the capture information. Particular, in the object detection system 100 according to the embodiment, the learning model generation device 106 can easily generate a learning model for object detection using supervised machine learning without spending time or manpower and use the generated learning model in the detection device 104(1) by installing a plurality of detection devices having different performances (detection device 104(1) and detection device 104(2) in the example of FIG. 1) in a plurality of locations and using determination data including detection results of the detection device 104(2) which performs highly accurate object detection as teacher data.

In addition, although it is difficult to install the detection device 104(2) which performs highly accurate determination near the detection location or to install a large number of devices due to an increase in hardware scale and power consumption, the detection device 104(2) is installed at a remote location using the network 105 and restrictions such as the installation location can be eliminated.

Here, although an example in which the capture device 103(1) and the capture device 103(2) capture propagation path information communicated between a pair of wireless devices such as the AP 101 and the STA 102 and transmit the capture information to the detection device 104(1) and the detection device 104(2) is shown in FIG. 1, another wireless device having an overlapping communication area and another capture device for capturing propagation path information communicated between the other wireless devices may be provided, the other capture device may capture propagation path information communicated between other wireless devices and transmit the capture information only to the detection device 104(2) and the detection device 104(2) may detect objects in the same range using the capture information received from other capture devices and the capture information received from the capture device 103 described above. Thus, the detection device 104(2) can perform highly accurate and highly functional object detection on the basis of more information, provide a learning model using more detailed determination data including object detection results to the learning model generation device 106 as teacher data, and generate a highly accurate learning model.

Furthermore, the detection device 104(2) may perform object detection using only a part of the information, instead of all of the information of the propagation path information captured by the capture device 103 or other capture devices.

(Sequence Example between AP 101 and STA 102)

FIG. 2 shows an example sequence of radio signals communicated between the AP 101 and the STA 102.

In FIG. 2, the AP 101 broadcasts a VHT NDP Announcement frame as a start signal for the sounding protocol for acquiring a CSI. Immediately after that, the AP 101 transmits a VHT NDP including data for measuring a CSI to a destination STA 102. Here, the VHT is an abbreviation for Very High Throughput and the IEEE802.11ac standard is based on the VHT frame for performing ultra-high-speed communication. Furthermore, the NDP is an abbreviation of a Null Data Packet and the VHT NDP is a frame which does not includes communication data. The VHT NDP Announcement frame includes addresses of the AP 101 and the destination STA 102 and is a frame for notifying the STA 102 of the transmission of the VHT NDP in advance. Note that, even when the VHT NDP Announcement frames are transmitted from specific one or more antennas or are transmitted from two or more antennas, the same data signal is transmitted from each of the antennas.

In FIG. 2, the STA 102 which receives the VHT NDP transmitted from the AP 101 derives the compressed CSI value by the method specified by IEEE802.11ac. The STA 102 stores the derived compressed CSI in the VHT Compressed Beamforming Report and transmits it. Here, although a CSI is obtained for each antenna of the AP 101, the amount of CSI information to be fed back to the AP 101 increases as the number of antennas increases. Therefore, the CSI (compressed CSI) selected from all CSI is fed back to the AP 101 by a method predetermined by the wireless LAN standard.

An example of an object detection method will now be described. In FIG. 1, the capture device 103 captures the CSI measured for each of the four antennas fed back from the STA 102 to the AP 101. For example, in FIG. 1, when the object 150 is moving in the direction of the dotted arrow, it enters the communication area from the AT(4) side of the AP101.

Furthermore, when the object 150 passes through to the AT(1) side, the CSI of AT(4) fluctuates first and the CSI fluctuates in order of time for AT(3), AT(2), and AT(1). In this way, an intrusion of the object 150 and a moving direction can be detected by detecting the CSI variation for each antenna.

Note that the detection method described above is just an example, it is possible to perform highly accurate and highly functional object detection which does not require real-time performance by analyzing a large amount of CSI accumulated for a predetermined period of time, in addition to simple object detection which requires real-time performance such as intrusion detection.

Here, although the detection device 104(1) which has a limited installation location performs simple object detection such as intrusion detection with low accuracy due to poor performance in the related art, object detection is performed using a learning model generated by machine learning using determination data including object detection results of the highly accurate detection device 104(2) as teacher data in the embodiment. Thus, highly accurate object detection is possible even with the low-performance detection device 104(1).

(Example of Object Detection Sequence)

FIG. 3 shows a sequence example of the object detection method according to the embodiment. Note that the sequence shown in FIG. 3 is performed by each device shown in FIG. 1.

In Step (1), communication is being performed between the AP 101 and the STA 102 as described with reference to FIG. 2. The capture device 103(1) monitors wireless LAN frames transmitted and received between the AP 101 and the STA 102.

In Step (2), the capture device 103(1) selects and captures only the VHT Compressed Beamforming Report frame (frame in which compressed CSI is stored) transmitted from the predesignated STA 102 to the AP 101 from the wireless LAN frames to be monitored.

In Step (3), the capture device 103(1) transmits the frame in which the captured compressed CSI is stored and information on the reception time of the frame to the detection device 104(1). Here, the capture device 103(1) transmits information including the own number thereof (an identifier unique to the device such as the serial number) to the detection devices 104 (1) and 104(2).

In Step (4), the detection device 104(1) detects an object in real time from the frame storing the compressed CSI received from the capture device 103(1) and the reception time information of the frame. Here, the detection device 104(1) performs object detection using a learning model received from learning model generation device 106 in Step (11) which will be described later. Note that, although the detection device 104(1) performs object detection without the learning model at the start of operation before receiving the learning model from the learning model generation device 106, Steps (1) to (11) are repeatedly performed in a short cycle and pose almost no practical problems.

In Step (5), the capture device 103(1) transmits the frame storing the compressed CSI captured in Step (2) and information on the reception time of the frame to the detection device 104(2), in parallel with the processing of Step (3). Note that all information captured by the capture device 103(1) may be transmitted to the detection device 104(2) or partial information may be thinned out, for example, once every two, to be transmitted to the detection device 104(2). This makes it possible to reduce the amount of information to be transmitted, for example, in accordance with the communication band between the capture device 103(1) and the detection device 104(2). Alternatively, thinning processing may be performed on the detection device 104(2) side.

In Step (6), the detection device 104(2) detects an object based on the frame storing the compressed CSI received from the capture device 103(1) and the reception time information of the frame. Here, the object detection algorithm used by the detection device 104(2) is higher accurate and functional than the object detection algorithm used by the detection device 104(1). Furthermore, the detection device 104(2) performs object detection in the same range as the detection device 104(1) using the propagation path information captured by another capture device (for example, the capture device 103(2)). Here, the other capture device may capture propagation path information between other wireless devices added to the AP 101 and the STA 102 (for example, AP 101a and STA 102a). In this case, it is assumed that the range of object detection between other wireless devices and the range of object detection between the AP 101 and the STA 102 are the same or overlap.

In Step (7), the detection device 104(2) transmits determination data including the object detection result to the learning model generation device 106 as teacher data.

In Step (8), the processes from Step (1) to Step (7) described above are repeatedly performed. Here, the processing from Step (1) to Step (11) may be repeatedly performed to include the processing from the subsequent Step (9) to Step (11) or Steps (9) to (11) may be performed every time Steps (1) to (7) are performed a predetermined number of times. Alternatively, the processing from Step (9) to Step (11) may be performed each time the learning model generation device 106 generates a new learning model.

In Step (9), the learning model generation device 106 performs supervised machine learning using determination data including the detection result received from the detection device 104(2) as teacher data to generate a learning model.

In Step (10), the learning model generation device 106 transmits the learning model generated in Step (9) to the detection device 104(1) over the network 105.

In Step (11), the detection device 104(1) analyzes the frame storing the compressed CSI received from the capture device 103(1) and the reception time information of the frame and performs object detection with reference to the learning model received from the learning model generation device 106.

Here, the operations from the above Steps (1) to (11) are repeatedly performed in parallel also for the capture device 103(2). That is to say, in FIG. 3, the capture device 103(1) is replaced with the capture device 103(2) and the operations from Step (1) to Step (11) are performed. Thus, for example, since a frame which cannot be captured by the capture device 103(1) can also be captured by the capture device 103(2), the detection device 104 (2) may perform object detection on the basis of information received from a plurality of capture devices 103.

In this way, in the object detection system 100 according to the embodiment, the detection device 104(1) performs object detection with reference to the learning model generated using the learning model generation device 106 through machine learning using determination data including the detection result of the detection device 104(2) capable of performing object detection with higher accuracy and functionality than the detection device 104(1) as teacher data. Thus, the detection device 104(1) can perform highly accurate object detection in real time.

Furthermore, although an appropriate learning model is not likely to be obtained due to biasing of the data occurring in the case of teacher data based only on information acquired by the single capture device 103(1), more accurate teacher data is obtained because the detection device 104(2) uses information acquired by the plurality of capture devices 103 such as the capture device 103(2). Thus, the learning model generation device 106 can generate a more appropriate learning model.

(Example of Capture Information Acquired by Detection Device 104)

FIG. 4 shows an example of capture information acquired by the detection device 104 from the capture device 103. Note that the frame in which the compressed CSI is stored and the capture information including the reception time information of the frame are accumulated in a storage unit such as an internal memory of the detection device 104.

The capture information is information such as a reception time when the capture device 103 captures a frame in which the compressed CSI is stored, an AP 101 address, an STA 102 address, the number of the capture device 103, and a CSI captured by the capture device 103 (acquired CSI).

Note that the respective addresses of the AP 101 and the STA 102 are acquired as the transmission source address and transmission destination address of the frame in which the compressed CSI is stored. Furthermore, the number of the capture device 103 is unique to the capture device 103 and the number of the capture device 103 is added to the information transmitted to the detection devices 104(1) and 104(2). The number of the capture device 103 is used to identify each capture device 103 when the plurality of capture devices 103 are disposed In the example of FIG. 4, the address of the capture target STA 102 preset in the capture device 103 is 11:22:33:44:55:66.

In FIG. 4, the CSI transmitted from the STA 102 having an address 11:22:33:44:55:66 to the AP 101 having an address AA:BB:CC:DD:EE:FF at reception time 14:00:00 is captured by the capture device 103(1) in which the device number is (1) and the CSIs acquired at this time are, for example, (1)11, (1)21, . . . . Similarly, the CSI transmitted from the STA 102 having an address 11:22:33:44:55:66 to the AP 101 having an address AA:BB:CC:DD:EE:FF at reception time 14:00:01 is captured by the capture device 103(2) having the device number of (1) and the CSIs acquired at this time are, for example, (1)11, (1)21, . . . . Thereafter, in the same way, capture information captured by a plurality of capture devices 103 is acquired in chronological order, such as reception time 14:00:02 and reception time 14:00:03 and stored in an internal memory or the like. Note that the acquired CSI will be described later.

Furthermore, although it is assumed that the reception time is every 1 sec and a CSI is captured every 1 sec to make the explanation easier to understand in the example of FIG. 4, the reception time may be every 10 msec or 100 msec in accordance with the specifications of the wireless system.

In addition, although the example of FIG. 4 shows a case in which one AP 101 and one STA 102 described in FIG. 1 communicate, for example, when there are a plurality of STAs 102, the STAs 102 have different addresses. Thus, for example, when the STA 102 having an address 11:22:33:44:55:66 and the STA 102 having an address 22:33:44:55:66:77 exist, capture information is obtained between each of the STA 102 and the AP 101. Note that the same applies to the case in which there are a plurality of APs 101.

Note that, when one target STA 102 set in the capture device 103 is provided even when there are the plurality of STAs 102, only information which is measured by the STA 102 which is a target and transmitted to the AP 101 is captured and transmitted to the detection device 104(1) and the detection device 104(2).

(Example of Compressed CSI)

FIG. 5 shows an example of a compressed CSI transmitted from the STA 102 to the AP 101. In FIG. 5, the number of transmitting antennas (the number of antennas of AP 101)×the number of receiving antennas (the number of antennas of STA 102), the number of compressed CSIs, and an example of compressed CSI are listed in order from the left column. Note that the number of transmission antennas is two or more.

Here, as described above, a CSI between antennas is measured in accordance with the number of antennas of the STA 102 and the number of antennas of the AP 101. Therefore, if the number of antennas increases, the amount of CSI information to be fed back to the AP 101 becomes enormous. Thus, a CSI (compressed CSI) selected from the CSI between all antennas according to the conditions determined by the wireless LAN standard is fed back to the AP 101 in a VHT Compressed Beamforming Report frame.

For example, when the number of transmission antennas is two and the number of reception antennas is one (denoted as 2×1), the number of compressed CSIs is 2 and the compressed CSIs are $\varphi 11$ and $\psi 21$. Similarly, for 2×2, the number of compressed CSI is 2, compressed CSI is $\varphi 11$, $\psi 21$, and for 3×1, the number of compressed CSI is 4, compressed CSI includes $\varphi 11$, $\varphi 21$, $\psi 21$, and $\psi 31$. Here, $\varphi ij$ corresponds to phase information between transmission antenna number i (i is an integer of 2 or more) and reception antenna number j (j is an integer of 1 or more) $\psi ij$ corresponds to amplitude information between transmitting antenna number i and receiving antenna number j. Thereafter, similarly, a compressed CSI is determined in accordance with a combination of the number of transmission antennas and the number of reception antennas.

In the object detection system 100 according to the embodiment shown in FIG. 1, the number of transmitting antennas is the number of antennas of the AP 101(4) and the number of receiving antennas is the number of antennas of the STA 102(1). In this case, a total of 8 CSIs, that is, 4 pieces of phase information and 4 pieces of amplitude information for each of the four antennas of AP 101 are measured. Also, six compressed CSIs ($\varphi 11$, $\varphi 21$, $\varphi 31$, $\psi 21$, $\psi 31$, $\psi 41$) are calculated from the measured 8 CSIs, like 4×1 shown in FIG. 5 and the calculated compressed CSI is transmitted to the AP 101. Here, the compressed CSI shown in FIG. 5 is an example. In the above case, $\varphi 11$ indicates the phase difference when signals transmitted from AT(4) and AT(1) are received by the antenna of the STA 102. Similarly, $\varphi 21$ indicates the phase difference between AT(4) and AT(2) and $\varphi 31$ indicates the phase difference between AT(4) and AT(3). Note that $\varphi ij \varepsilon [0, 2\pi)$ in which i and j are positive integers. Also, $\psi 21$ indicates a value, expressed in angle, of the amplitude ratio when the signals transmitted from AT(1) and AT(2) are received by the antenna of STA 102 (value of tan-1 of ratio of absolute value of amplitude). Similarly, $\psi 21$ represents the amplitude ratio between AT(1) and AT(2) and $\psi 31$ represents the amplitude ratio between AT(1) and AT(3). Note that $\psi ij \varepsilon [0, \pi/2)$ in which i and j are positive integers.

Thus, the STA 102 measures a CSI on the basis of the reference signal transmitted from the AP 101 and transmits a compressed CSI to the AP 101. The capture device 103 captures the compressed CSI transmitted from the STA 102 to the AP 101 and transmits it to the detection device 104(1) and the detection device 104(2).

Here, although the positions of the capture device 103(1) and the capture device 103(2) are near the middle between the AP 101 and the STA 102 as shown in FIG. 1 in the embodiment, any position in which a signal from the STA 102 can be received is acceptable. Also, although there is one STA 102 in FIG. 1, a plurality of STAs 102 may be used. Also, the embodiment may be applied to communication between the AP 101 and another AP 101 (in this case, one AP 101 functions as the STA 102).

Furthermore, the AP 101 or the STA 102 may include the functionality of the capture device 103 and the detection device 104(1). In this case, the AP 101 or the STA 102 having the function of the capture device 103 transmits the capture information to the distant detection device 104(2) and receives the learning model from the learning model generation device 106 and the AP 101 or the STA 102 having the functionality of the detection device 104(1) performs object detection.

As described above, in the object detection system 100 according to the embodiment, objects in the communication area can be detected on the basis of the capture information by capturing, by the capture device 103, the wireless frame in which the compressed CSI transmitted from the STA 102 to the AP 101 is stored. Particularly, when a plurality of detection devices having different performance (detection device 104(1) and detection device 104(2) in the example of FIG. 1) are installed at a plurality of locations and determination data including object detection results of the detection device 104(2) which performs highly accurate object detection is used as teacher data in the object detection system 100 according to the embodiment, the learning model generation device 106 can easily generate a learning model for object detection using supervised machine learning without spending time or manpower and the generated learning model can be used by the detection device 104(1).

Moreover, although it is difficult to perform installation near the detection location or to install a large number of devices because the hardware scale and power consumption of the detection device 104(2) which performs highly accurate determination are large in the embodiment. Thus, the detection device 104(2) is installed at a remote location using the network 105 and restrictions such as installation location can be eliminated.

Here, a program corresponding to the processing performed by the detection device 104(1), the detection device 104(2), and the learning model generation device 106 may be executed by a general-purpose computer or an integrated circuit such as a field programmable gate array (FPGA). Also, the program may be provided by being recorded on a storage medium, or may be provided through a network.

Thus, in an object detection system and an object detection method according to the present invention, a learning model for object detection using supervised machine learning can be easily generated without spending time or manpower and the generated learning model can be used in other detection devices by installing a plurality of detection devices having different performance in a plurality of locations and using determination data including the detection results of the detection devices which perform highly accurate object detection as learning data in a system which detects objects in a communication area from propagation path information of radio signals.

REFERENCE SIGNS LIST

100 Object detection system

101 AP

102 STA 103(1), 103(2) Capture device 104(1), 104(2) Detection device

105 Network

106 Learning model generation device

150 Object

12

The invention claimed is:

1. An object detection system for detecting an object between two or more wireless devices on a basis of propagation path information between the two or more wireless devices, comprising:

a capture device configured to capture propagation path information between the two or more wireless devices and transmit the captured propagation path information to a first detection device and a second detection device; and a learning model generation device configured to generate a learning model for object detection using supervised machine learning, wherein the first detection device is configured to perform object detection between the two or more wireless devices using the generated learning model, wherein the first detection device is configured to perform the object detection with a first accuracy, the second detection device is configured to perform object detection with a second accuracy, wherein the second accuracy is greater than the first accuracy, and, the learning model generation device is configured to generate teacher data using determination data including object detection results of the second detection device, wherein the learning model generation device is configured to update the learning model used by the first detection device with the teacher data.

2. The object detection system according to claim 1, further comprising:

another capture device which captures propagation path information between other wireless devices, wherein the second detection device is configured to detect an object in the same range as the first detection device using propagation path information between the other wireless devices captured by the other capture device.

3. The object detection system according to claim 1, wherein the second detection device is configured to detect an object using a portion of the captured propagation path information.

4. An object detection method for detecting an object between two or more wireless devices on a basis of propagation path information between the two or more wireless devices, comprising:

capturing, by a capture device, propagation path information between the two or more wireless devices;

transmitting, by the capture device, the captured propagation path information to a first detection device and a second detection device;

generating, by a learning model generation device, a learning model for object detection using supervised machine learning;

performing, by the first detection device, object detection between the two or more wireless devices using the generated learning model with a first accuracy;

performing, by the second detection device, object detection with a second accuracy, wherein the second accuracy is greater than the first accuracy;

generating, by the learning model generation device, teacher data using determination data including object detection results of the second detection device; and updating, by the learning model generation device, the learning model used by the first detection device with the teacher data.

5. The object detection method according to claim 4, further comprising:

capturing, by another capture device, propagation path information between other wireless devices; and detecting, by the second detection device, an object in the same range as the first detection device using propagation path information between the other wireless devices captured by the other capture device.

6. The object detection method according to claim 4, further comprising:

performing, by the second detection device, object detection using a portion of the captured propagation path information.

\* \* \* \* \*